US006953101B2

(12) United States Patent
Gesser

(10) Patent No.: US 6,953,101 B2
(45) Date of Patent: Oct. 11, 2005

(54) INDUSTRIAL TRUCK WITH A DRIVE UNIT WHICH IS FASTENED TO A NEIGHBORING FRAME SEGMENT OF A VEHICLE FRAME

(75) Inventor: Markus Gesser, Hanau (DE)

(73) Assignee: Linde Aktiengesellschaft (DE)

( * ) Notice: Subject to any disclaimer, the term of this patent is extended or adjusted under 35 U.S.C. 154(b) by 203 days.

(21) Appl. No.: 10/173,544

(22) Filed: Jun. 17, 2002

(65) Prior Publication Data

US 2003/0024755 A1 Feb. 6, 2003

(30) Foreign Application Priority Data

Jun. 20, 2001 (DE) ........................................ 101 29 782

(51) Int. Cl.[7] ................................................ B62D 49/00

(52) U.S. Cl. .................................... 180/89.12; 180/291

(58) Field of Search ............................. 180/89.12, 68.4, 180/414, 417, 267, 266, 280, 291, 298, 312, 290, 292, 294, 296, 300, 307, 311, 211, 89.1; 123/195 R, 195 C; 417/362, 360, 364

(56) References Cited

U.S. PATENT DOCUMENTS 3,901,339 A * 8/1975 Williamson ................. 180/307
4,508,072 A * 4/1985 Takami et al. .............. 180/291
4,560,027 A * 12/1985 Murakami et al. .......... 180/312
4,564,082 A * 1/1986 Takehara et al. ............ 180/312
4,580,650 A * 4/1986 Matsuda .................... 180/89.1
4,741,676 A * 5/1988 Janes ......................... 417/362
5,101,928 A * 4/1992 O'Connor ................... 180/291
5,152,658 A * 10/1992 Martin ....................... 180/308
5,437,344 A * 8/1995 Wada ......................... 180/291
6,454,034 B1 * 9/2002 Gotz ....................... 180/89.12
6,641,355 B1 * 11/2003 McInerney et al. ......... 180/211

FOREIGN PATENT DOCUMENTS

DE 198 49753 A1 5/2000

* cited by examiner

*Primary Examiner*—Hau Phan
(74) *Attorney, Agent, or Firm*—The Webb Law Firm

(57) ABSTRACT

An industrial truck, in particular a fork lift truck, is provided with a rear weight and an internal combustion engine. The internal combustion engine is fastened to the rear weight. The internal combustion engine is advantageously mounted so that it can oscillate around an axis that extends in the transverse direction of the industrial truck.

16 Claims, 2 Drawing Sheets

INDUSTRIAL TRUCK WITH A DRIVE UNIT WHICH IS FASTENED TO A NEIGHBORING FRAME SEGMENT OF A VEHICLE FRAME

CROSS-REFERENCE TO RELATED APPLICATION

This application claims priority to German Application No. 101 29 782.3, filed Jun. 20, 2001, which is herein incorporated by reference in its entirety.

BACKGROUND OF THE INVENTION

This invention relates to an industrial truck with a drive unit which has an internal combustion engine and at least one unit that is driven by it and is located on the end, in particular a hydraulic pump, and is fastened to a neighboring frame segment of a vehicle frame. The term "on the end" as used herein means that the unit is located in an extension of the axis of rotation of the crankshaft.

An object of the invention is to provide an industrial truck of the type described above, the drive unit of which is mounted so that it makes more efficient utilization of the space available for its installation.

SUMMARY OF THE INVENTION

The invention teaches that this object can be accomplished by locating a plurality of bearings inside the axial extension of the drive unit. Therefore, there are no bearings on the longitudinal ends of the drive unit. As a result of which, the space required in this direction is reduced, which is advantageous in particular when the drive unit is installed transversely in the industrial truck. The bearings are thereby placed so that they do not block access to the wear points of the drive unit. For example, the toothed belt of the internal combustion engine, which can be located on the longitudinal end opposite the unit, is easily accessible for inspection and replacement.

In one advantageous configuration of the invention, a first bearing and a second bearing at some distance from the first bearing in the axial direction are located diagonally below the center of gravity of the drive unit, in the direction of the frame segment of the vehicle provided for the fastening of the drive unit. A third bearing is located diagonally above the center of gravity. In this case, the first and second bearings can be advantageously located in a common plane, in particular in a plane below the drive unit. The third bearing can be advantageously located in the vicinity of an intermediate flange of the drive unit, which intermediate flange can be located axially between the internal combustion engine and the unit.

In this configuration of the invention, after the removal of the third (top) bearing, the drive unit can be tilted away from the frame segment, so that the starter of the internal combustion engine can be replaced, for example. The pump is also accessible from above without obstruction.

In an additional embodiment of the invention, however, it is also possible to provide an arrangement of the bearings in which a first bearing is located diagonally below the center of gravity of the drive unit second bearing and a third bearing at some distance from the second bearing in the axial direction is located diagonally above the center of gravity. In this case, the second and the third bearings can be located in a common plane.

It is particularly favorable if the industrial truck is a fork-lift truck with a counterweight on the rear end, the drive unit is oriented transverse to the longitudinal axis of the vehicle, and the counterweight is a frame segment for the mounting of the drive unit.

As a result of the direct coupling of the drive unit over a short distance to the counterweight, there are advantages in terms of vibration reduction, because the points where the force is introduced have a high rigidity.

In one development of the invention, an exhaust system connected to the internal combustion engine is fastened to the counterweight. An isolating element that equalizes movements of the internal combustion engine can be integrated into the exhaust system and the bearings can be located so that movements of the drive unit relative to the counterweight that are excited by bumps in the floor or road occur around a center of motion which is located in the vicinity of the isolating element or next to it. As a result of this arrangement of the center of motion, there are only small lateral deflections for the relatively sensitive isolating element when the drive unit is deflected and rebounds.

BRIEF DESCRIPTION OF THE DRAWINGS

Additional advantages and details of the invention are described in greater detail below, with reference to the exemplary embodiment illustrated in the accompanying schematic figures, in which.

DESCRIPTION OF THE PREFERRED EMBODIMENTS

The industrial truck of the invention is realized in this exemplary embodiment in the form of a counterweight fork-lift truck with a drive unit 1 that is oriented transverse to the direction of travel and has a hydraulic pump 3 located on its end surface. The direction of travel is along the x-axis, with reference to the three-dimensional coordinate system illustrated in the accompanying figures. Of course, the suspension of the drive unit 1 described below can also be used for a longitudinal installation in a fork-lift truck. However, it is particularly advantageous for the transverse installation and fastening to the drive unit on the rear-end counterweight.

The pump 3 can be provided for a hydrostatic traction drive and/or a hydraulic work system of the fork-lift truck. It is further possible to attach a second pump 4 (auxiliary pump, e.g., for a hydraulic steering system) as an extension of the pump 3 by means of a flange, as illustrated in the figures.

Figure 1:
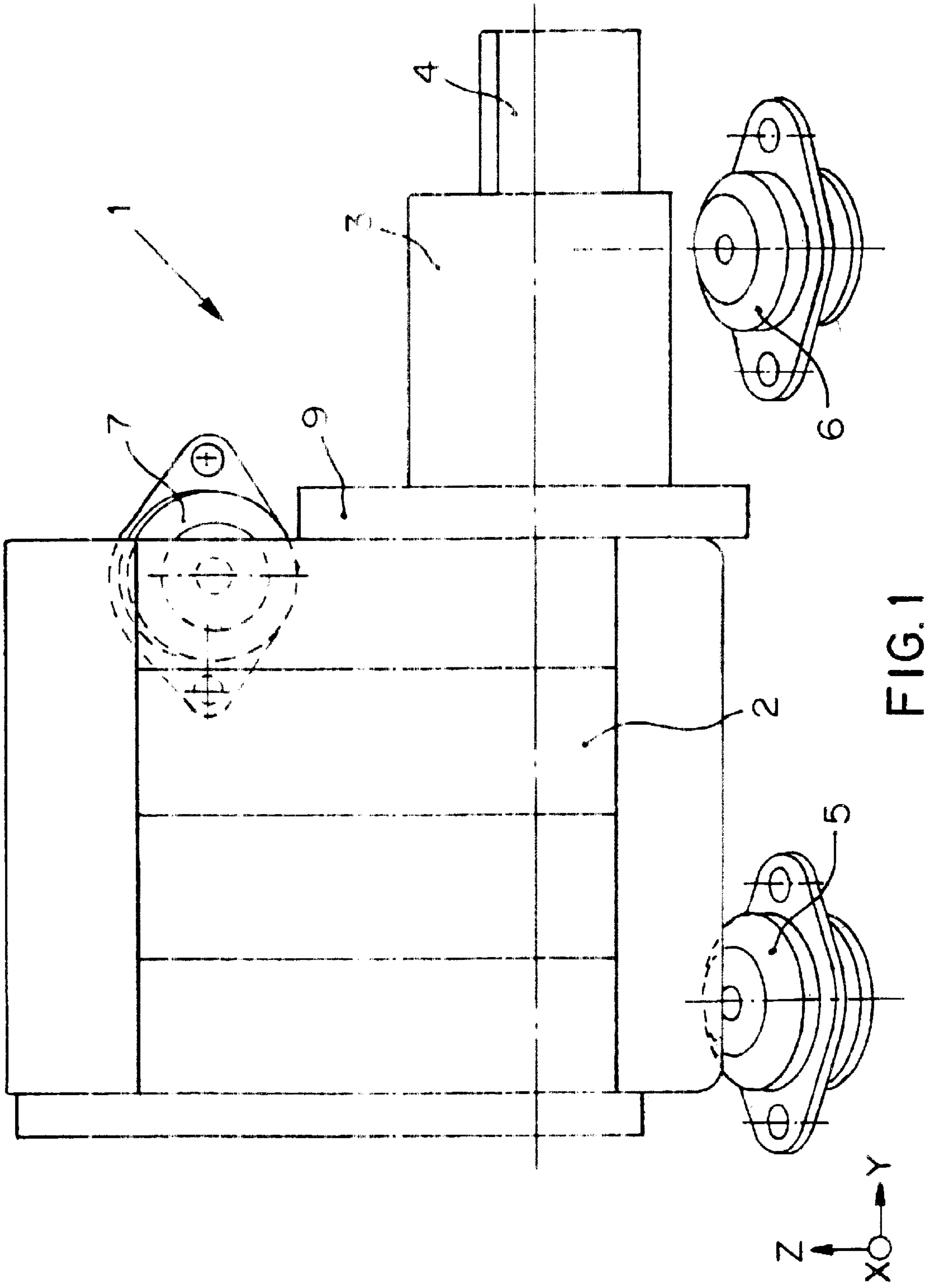
FIG. 1 is a view of a drive unit of the industrial truck of the invention toward the frame segment of the vehicle frame to which the drive unit is fastened.
Figure 2:
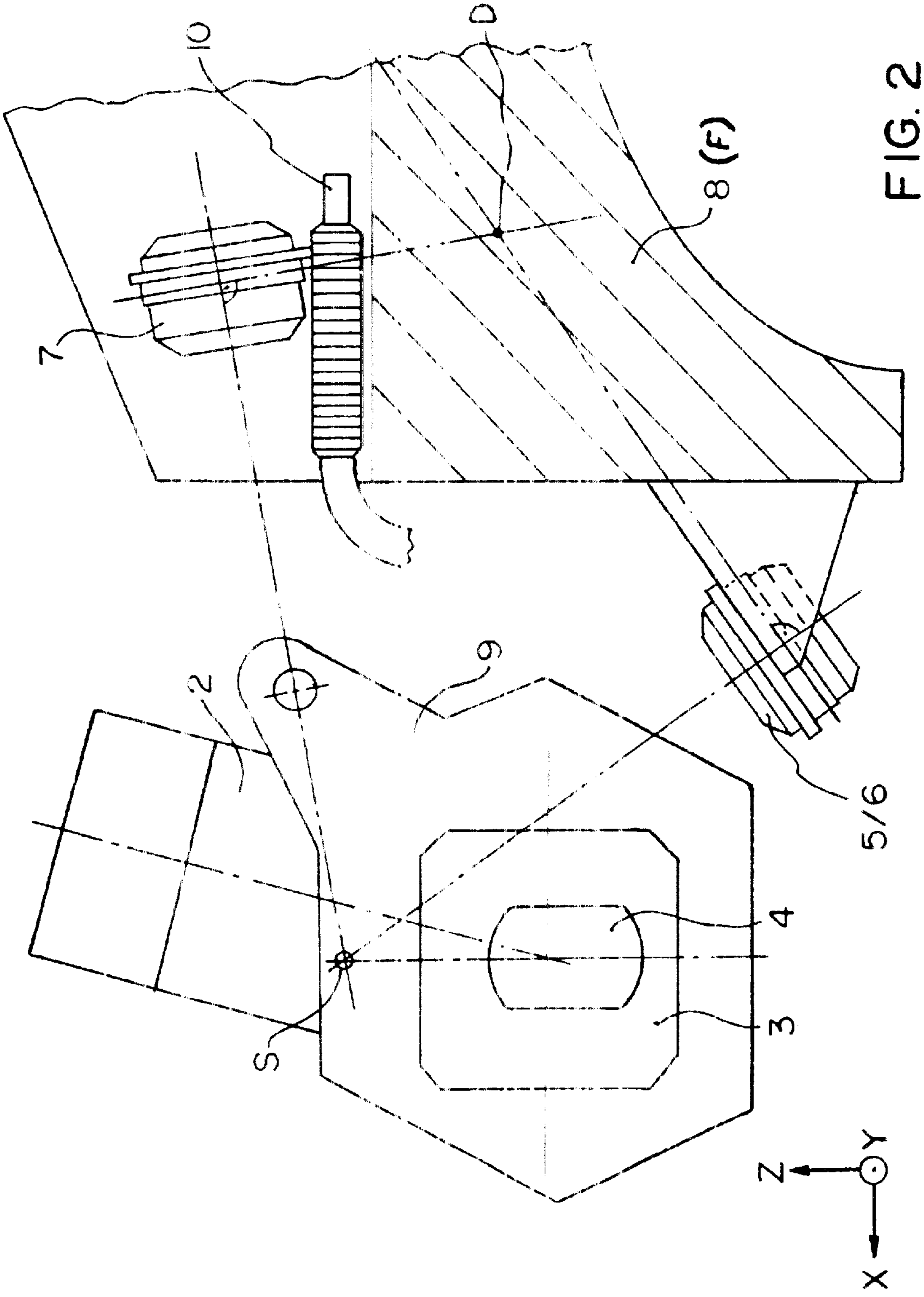
FIG. 2 is a side view of the drive unit illustrated in FIG. 1.

The drive unit 1 is fastened by means of three bearings 5, 6, and 7, all of which are inside the axial extension of the drive unit (see FIG. 1), to a rear-end counterweight 8 (see FIG. 2 ) of the fork-lift truck which forms a frame segment F of the vehicle frame. In this case, the first bearing 5 and the second bearing 6 are located in a common plane below the drive unit 1 and, thus, below the center of gravity S (FIG. 2 ) of the drive unit 1. The third bearing 7 is located above the center of gravity S between the first bearing 5 and the second bearing 6 in the vicinity of an intermediate flange 9 located between the internal combustion engine 2 and the pump 3.

The bearings 5, 6, and 7 are, therefore, arranged so that the space required by the drive unit 1 in the y-direction (transverse direction of the fork-lift truck) is minimized, and also that access to the wear parts is not blocked. The space above the pump 3 can be used for an air filter of the internal combustion engine 2. The toothed belt of the internal combustion engine 2 located on the end opposite the pump 3 is accessible without obstruction. After removal of the third (upper) bearing 7, the drive unit 1 can be tipped forward to facilitate the replacement of the starter.

As a result of the direct attachment of the drive unit 1 to the counterweight 8 over a short distance, the points at which the forces are introduced are very rigid. The high mechanical input resistance at the points of attachment makes the introduction of vibrations of the drive unit 1 into the counterweight 8 more difficult.

When a horizontal force component generated by the high pressure lines of the pump 3 is exerted on the drive unit 1, the bearings 5, 6, and 7, on account of their angular position, are each compressed with a component of force in their principal direction of action. Consequently, the suspension of the drive unit 1 is not as sensitive to deviations from the statically designed operating point as a suspension in which the bearings are located in a plane and the above-mentioned horizontal force component lies perpendicular to the principal direction of action of the bearings.

The arrangement of the bearings points 5, 6, and 7 can theoretically also be reversed, so that two bearings are located diagonally above and one bearing diagonally below the center of gravity S.

Fastened to the counterweight 8 is an exhaust system which is connected to the internal combustion engine 2 and is not shown in any further detail in the figures. The exhaust system contains an isolating element 10 which equalizes the relative movements of the internal combustion engine 2 and/or of the drive unit 1 with respect to the counterweight 8. The arrangement of the bearings 5, 6, and 7 is selected so that relative movements of the drive unit 1 excited by bumps in the floor or road occur around a center of motion D which, in the exemplary embodiment illustrated, is next to the isolating element 10 (in the ideal case, the center of motion D is in the vicinity of the isolating element 10). Consequently, lateral movements (in particular in the direction of the x-axis) of the relatively sensitive isolating element 10 are minimized, which increases the useful life of the isolating element 10.

It will be readily appreciated by those skilled in the art that modifications may be made to the invention without departing from the concepts disclosed in the foregoing description. Accordingly, the particular embodiments described in detail herein are illustrative only and are not limiting to the scope of the invention, which is to be given the full breadth of the appended claims and any and all equivalents thereof.

What is claimed is:

1. An industrial truck, comprising:

a drive unit having an internal combustion engine having an end;

at least one unit driven by the engine and located on the end, wherein the unit is fastened to a neighboring frame segment of a vehicle frame; and a plurality of bearings located inside an axial extension of the drive unit including a first bearing and a second bearing, wherein the second bearing is at a spaced distance in an axial direction from the first bearing, wherein the first and second bearings are located diagonally below a center of gravity of the drive unit, and wherein a third bearing is located diagonally above the center of gravity.

2. The industrial truck as claimed in claim 1, wherein the first and the second bearings are located in a common plane.

3. The industrial truck as claimed in claim 2, wherein the second bearing is in the vicinity of an intermediate flange of the drive unit located axially between the internal combustion engine and the at least one unit.

4. An industrial truck as claimed in claim 2, wherein the industrial truck is a fork-lift truck with a rear-end counterweight, wherein the drive unit is oriented transverse to a longitudinal axis of the truck, and the counterweight is provided as a frame segment for the mounting of the drive unit.

5. The industrial truck as claimed in claim 2, wherein the plane is located below the drive unit.

6. The industrial truck as claimed in claim 1, wherein the second bearing is in the vicinity of an intermediate flange of the drive unit located axially between the internal combustion engine and the at least one unit.

7. An industrial truck as claimed in claim 6, wherein the industrial truck is a fork-lift truck with a rear-end counterweight, wherein the drive unit is oriented transverse to a longitudinal axis of the truck, and the counterweight is provided as a frame segment for the mounting of the drive unit.

8. An industrial truck as claimed in claim 1, wherein the industrial truck is a fork-lift truck with a rear-end counterweight, wherein the drive unit is oriented transverse to a longitudinal axis of the truck, and the counterweight is provided as a frame segment for the mounting of the drive unit.

9. The industrial truck as claimed in claim 1, including an exhaust system connected to the internal combustion engine and fastened to the counterweight, including an isolating element that equalizes movements of the internal combustion engine integrated into the exhaust system, and wherein the bearings are arranged so that the movements of the drive unit relative to the counterweight excited by bumps in the floor or road occur around a center of motion which is located in the vicinity of the isolating element or next to it.

10. The industrial truck as claimed in claim 1, wherein the unit is a hydraulic pump.

11. An industrial truck, comprising:

a drive unit having an internal combustion engine having an end;

at least one unit driven by the engine and located on the end, wherein the unit is fastened to a neighboring frame segment of a vehicle frame; and a plurality of bearings located inside an axial extension of the drive unit including a first bearing, a second bearing, and a third bearing, wherein the first bearing is located diagonally below a center of gravity of the drive unit in a direction of the frame segment, wherein the third bearing is at a spaced distance in an axial direction from the second bearing, and wherein the second and third bearings are located diagonally above the center of gravity.

12. The industrial truck as claimed in claim 11, wherein the second and the third bearings are located in a common plane.

13. An industrial truck as claimed in claim 12, wherein the industrial truck is a fork-lift truck with a rear-end counterweight, wherein the drive unit is oriented transverse to a longitudinal axis of the truck, and the counterweight is provided as a frame segment for the mounting of the drive unit.

14. An industrial truck as claimed in claim 11, wherein the industrial truck is a fork-lift track with a rear-end counterweight, wherein the drive unit is oriented transverse to a longitudinal axis of the truck, and the counterweight is provided as a frame segment for the mounting of the drive unit.

15. The industrial truck as claimed in claim 11, including an exhaust system connected to the internal combustion engine and fastened to the counterweight, including an isolating element that equalizes movements of the internal combustion engine integrated into the exhaust system, and wherein the bearings are arranged so that the movements of the drive unit relative to the counterweight excited by bumps in at least one of a floor or road occur around center of motion which is located in the vicinity of the isolating element or next to it.

16. The industrial truck as claimed in claim 11, wherein the unit is a hydraulic pump.

* * * * *

UNITED STATES PATENT AND TRADEMARK OFFICE

CERTIFICATE OF CORRECTION

PATENT NO. : 6,953,101 B2 Page 1 of 1
DATED : October 11, 2005
INVENTOR(S) : Gesser It is certified that error appears in the above-identified patent and that said Letters Patent is hereby corrected as shown below:

Title page,
Item [57], ABSTRACT, should read:

-- An industrial truck has a drive unit, an internal combustion engine, and at least one unit (hydraulic pump) located on the end of the engine and driven by it. The drive unit can be oriented transverse to the longitudinal axis of the vehicle and fastened to a neighboring segment of a vehicle frame, such as a counterweight. A plurality of bearings are located inside the axial extension of the drive unit. Diagonally below the center of gravity of the drive unit, there are a first bearing and at a distance from it in the axial direction a second bearing, which can be in a common plane located below the drive unit. Diagonally above the center of gravity there is a third bearing which is near an intermediate flange of the drive unit, which intermediate flange is located between the internal combustion engine and the unit. --.

Column 4,
Lines 37-38, "in the floor" should read -- in at least one of a floor --.
Line 67, "fork-lift track" should read -- fork-lift truck --.

Column 6,
Line 3, "around center" should read -- around a center --.

Signed and Sealed this

Twenty-fifth Day of April, 2006

JON W. DUDAS
*Director of the United States Patent and Trademark Office*